United States Patent
Ryu

(10) Patent No.: US 7,382,396 B2
(45) Date of Patent: Jun. 3, 2008

(54) IMAGE DATA PROCESSING SYSTEM AND METHOD OF MOBILE COMMUNICATION TERMINAL

(75) Inventor: Hae Jeong Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 10/865,768

(22) Filed: Jun. 14, 2004

(65) Prior Publication Data

US 2005/0030369 A1 Feb. 10, 2005

(30) Foreign Application Priority Data

Jun. 14, 2003 (KR) .................. 10-2003-0038544

(51) Int. Cl.
*H04N 7/14* (2006.01)
*H04M 11/00* (2006.01)

(52) U.S. Cl. ............................... 348/14.01; 348/14.02

(58) Field of Classification Search .. 348/14.01–14.09, 348/14.1, 14.11, 14.12, 14.13; 455/556.1, 455/556.2; 370/260, 261
See application file for complete search history.

(56) References Cited

U.S. PATENT DOCUMENTS 5,611,038 A 3/1997 Shaw et al.
6,538,686 B2 3/2003 Hara et al.
6,701,017 B1 * 3/2004 Nagata et al. ............... 382/232
2004/0119814 A1 * 6/2004 Clisham et al. .......... 348/14.08

FOREIGN PATENT DOCUMENTS

JP 07-288806 10/1995
JP 409009222 A * 1/1997
JP 2002-118598 * 4/2002

OTHER PUBLICATIONS

Yanagisawa; Mobile Tadio Terminal; 4-5 2991; WO 01/24523.*
European Patent Office Search Report dated Sep. 22, 2004, 3 pages.
Japanese Office Action dated Apr. 23, 2007.

* cited by examiner

*Primary Examiner*—Melur Ramakrishnaiah
(74) *Attorney, Agent, or Firm*—Ked & Associates, LLP

(57) ABSTRACT

In an image processing method for a mobile communication terminal, a threshold value is set in advance for a state of traffic. A processing buffer of a second layer of the mobile terminal then analyzes a current state of traffic and compares it with the pre-set threshold value. If the traffic exceeds the threshold value, resolution of an image input through a camera is reduced, and the resolution-reduced image is transmitted. As a result, a natural looking image can be provided according to the state of traffic and thus reliability of a service quality can be enhanced.

29 Claims, 4 Drawing Sheets

IMAGE DATA PROCESSING SYSTEM AND METHOD OF MOBILE COMMUNICATION TERMINAL

BACKGROUND OF THE INVENTION

1. Field of the Invention.

The present invention generally relates to an image data processing method of a mobile communication system, and more particularly to a system and method for performing image processing in a mobile communication terminal.

2. Background of the Related Art.

Mobile communication terminals have evolved into multifunctional devices that process multimedia data in addition for performing voice communications. To perform these functions, mobile terminals include a large-scale memory, a high performance controller, and signal processor for handling complex calculations. These terminals also include a camera function.

The camera function allows mobile terminals to perform a video telephony service, in which image and voice signals are transmitted simultaneously at a fixed bearer rate. With this service, a user can perform voice call communication while viewing the other party or an image shot by the other party through the video telephony service.

In general, a maximum resolution of an image obtained through a camera in a mobile communication terminal is determined by: horizontal pixel number*the vertical pixel number*the color construction number.

In a related-art video telephony service of a mobile communication terminal, an image obtained by a camera is transmitted in a data state having maximum resolution, so the size of the transmission data is very large. The unit used to discriminate a series of images by a temporal construction is known as fps (frame per second). The higher the fps, the more natural looking the video provided by the video telephony service.

However, the related-art video telephony service the amount by which fps can be increased is limited by the conditions of the communications network. Since more data is transmitted as fps increases, the possibility of generating data loss is increased accordingly.

In other words, in the video telephony service of the related-art mobile communication terminal, since the image input by the camera is transmitted as is, if traffic between the mobile terminal and a base station is congested, normal set frames are not all properly transmitted but rather may be transmitted as cut images. And since each image itself consumes a large quantity of data, single frame of a transmitted image is therefore broken.

As mentioned above, since high capacity image data input through the camera is transmitted as is, a frame may not be transmitted within a certain time according to the traffic state of a communication network. As a result, a natural looking video will not be provided to the receiver terminal.

In addition, when traffic of a communication network is congested, data for a single frame is not normally transmitted. As a result, the image data is partially lost and a broken image is provided. This result in a deterioration in reliability for providing quality video telephony service.

SUMMARY OF THE INVENTION

An object of the invention is to solve at least the above problems and/or disadvantages and to provide at least the advantages described hereinafter.

Another object of the present invention is to provide an image data processing system and method which, when implemented in a mobile communication terminal, analyzes traffic of a data link layer during video telephony and automatically converts the resolution of image data according to the traffic state.

To achieve at least the above objects and advantages in whole or part, the present invention provides in accordance with one embodiment an image data processing system and method which analyzes traffic in a data link layer and reduces resolution of an image input from a camera with a threshold value previously set according to a state of the traffic. The resolution-reduced image is then transmitted to a receiver terminal.

In accordance with another embodiment, the present invention provides an image data processing system and method for a mobile communication terminal which pre-sets one or more threshold values of certain stages according to states of traffic, analyzes a current state of traffic using a processing buffer of a second layer of the terminal when video telephony is started, compares the state of traffic and the threshold value and converts a resolution of an image input from a camera of the terminal, and transmits the resolution-converted image.

In accordance with another embodiment, the present invention provides an image data processing system and method for a mobile terminal which pre-sets one or more threshold values of certain stages according to states of traffic, analyzes a current state of traffic using a processing buffer of a second layer of the terminal when video telephony is started compares the state of traffic and the threshold value, reduces resolution of an image input from a camera of the terminal by applying a certain size of a window to the image, and transmits the resolution-reduced image.

DETAILED DESCRIPTION OF PREFERRED EMBODIMENTS

An image data processing system and method performed in a mobile communication terminal in accordance with a preferred embodiment of the present invention will now be described. In performing image transmission, if resolution of a still image is reduced, quality of the corresponding image may be lowered significantly. However, a broken image included in video would lower quality much more than a resolution reduction.

The adverse effects of resolution reduction versus broken images in a video can be understood as follows. In a mobile communication terminal having a display unit that operates relatively slowly and has low brightness, resolution reduction of video can be compensated in a way that can be recognized by a user through continuity of images. However, in implementing video through a mobile terminal, the occurrence of a phenomenon where an image is cut off or a portion of an image is broken due to loss of a frame would result in fatal quality degradation, and this is so in spite of the fact that the video images were transmitted at high resolution.

Thus, in the image data processing method of a mobile communication terminal in accordance with the present invention, threshold values are set at various traffic stages, resolution of an image is changed by comparing traffic conditions with the pre-set threshold values during video telephony, and the resolution-changed image is then transmitted. As a result, reception of the video may be maintained without a break or discontinuity.

Figure 1:
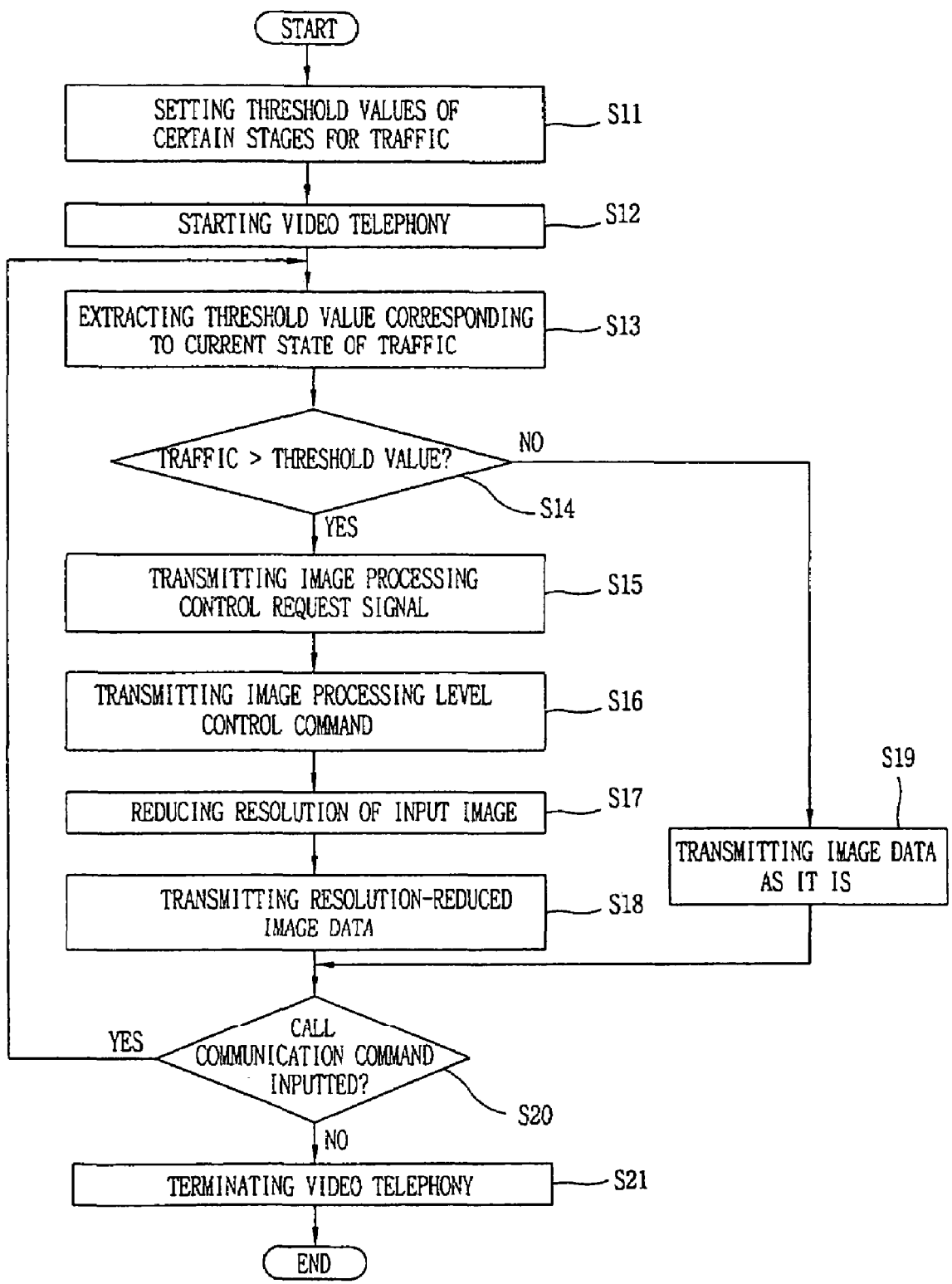
FIG. 1 is a flow chart showing steps included in a method for performing image data processing in a mobile communication terminal in accordance with a preferred embodiment of the present invention.

FIG. 1 is a flow chart showing steps included in an image data processing method performed in a mobile communication terminal in accordance with a preferred embodiment of the present invention. Initially, threshold values are set at different traffic conditions between the mobile terminal and a network (step S11). Each threshold value corresponds to a predetermined (e.g., maximum) data transmission quantity that can sustain a desired level or type (e.g., video telephony) of image transmission from the mobile terminal. The threshold values may be set to decrease with increasing traffic in the network.

When a user starts video telephony with another party using the camera of his mobile terminal (step S12), the processing buffer recognizes a current state of traffic, extracts a corresponding pre-set threshold value from memory (step S13), and determines whether a state of traffic reaches the pre-set threshold value (step S14). The extracting and determining steps may be performed, for example, by comparing the current traffic state to one or more pre-set threshold values stored in memory.

When the traffic reaches the pre-set threshold value (e.g., this may involve determining which of a plurality of pre-set and pre-stored threshold values is closest to the current traffic state), the processing buffer transmits a signal requesting control of an image processing level to an upper layer (step S15), and then the upper layer transmits an image processing level control command to a lower layer of the processing buffer in response to the request signal.

The lower layer changes resolution of an image input from the camera of the terminal (step S17), and then the processing buffer reads and transmits the resolution-changed image (step S18).

In other words, the processing buffer corresponding to the data link layer of the mobile communication terminal transmits the signal requesting control of the image processing level to a third layer, and then the third layer reduces resolution by applying a window having a certain size to the image obtained through the camera. The pre-set threshold values and information corresponding to predetermined window sizes may be stored, for example, in table form in a terminal memory.

Various techniques can be used for resolution conversion in accordance with the present invention. One technique involves changing resolution using an nxn pixel of window. Performing resolution change in this manner is simple and can be performed at high speed.

If the traffic does not reach the pre-set threshold value, an image input from the camera of the mobile terminal is transmitted as is (e.g., without undergoing resolution reduction) through the network (step S19).

Thereafter, it is determined whether video telephony using the mobile terminal is terminated (step S20). If a call communication termination command is input, the video telephony process is terminated (S21). If the call communication command is not input, the process is repeated until the video telephony is terminated.

Figure 2:
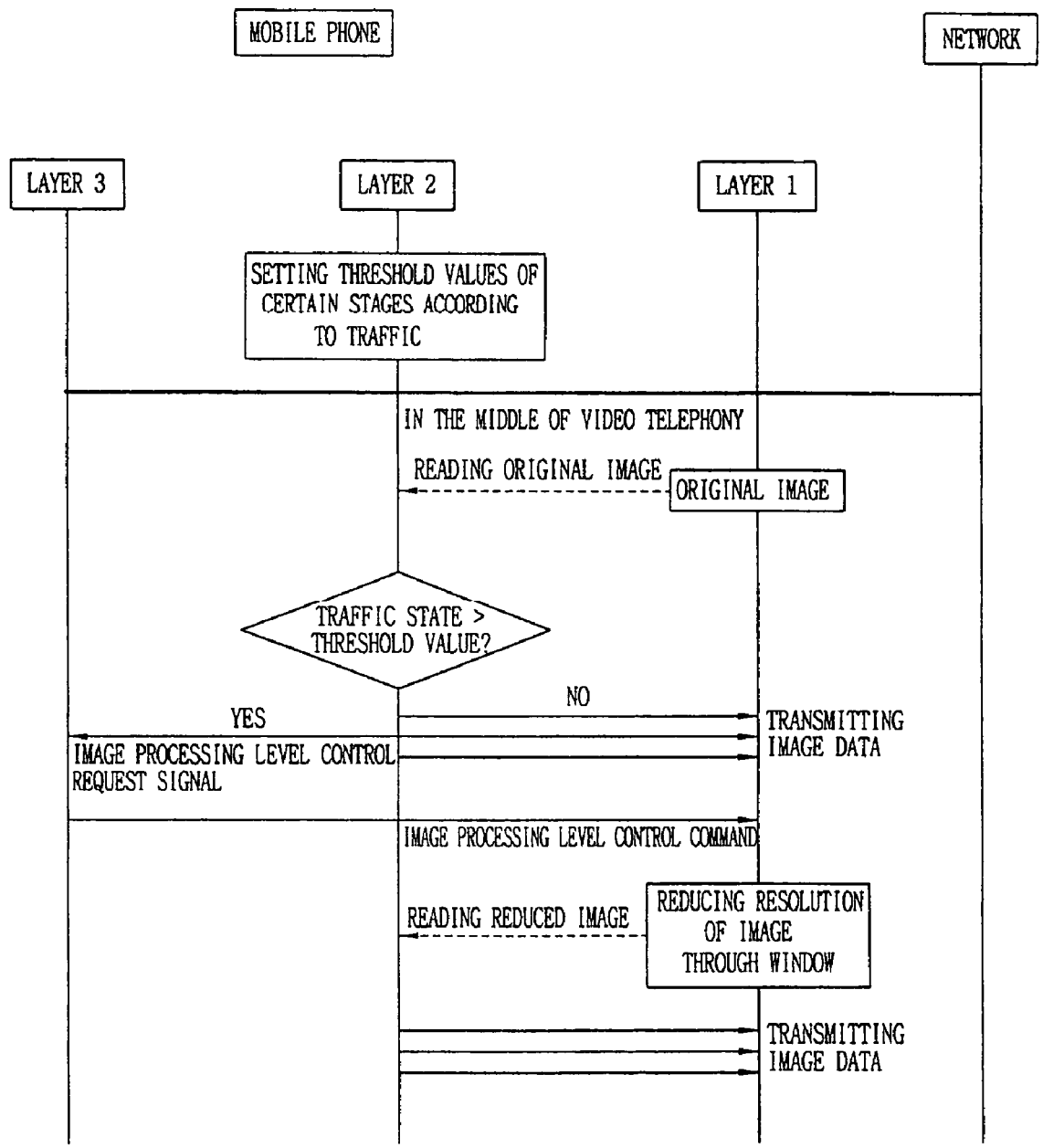
FIG. 2 is a diagram showing signal flow that occurs during an image data processing operation performed in accordance with the preferred embodiment of the present invention.

FIG. 2 illustrates an image data processing operation performed in a mobile communication terminal in accordance with the preferred embodiment of the present invention. Operations of changing resolution of an image according to traffic during video telephony and transmitting the image will now be described.

A certain stage of a threshold value is set according to a state of traffic recognized by the processing buffer of the data link layer of the mobile terminal, and the a network is connected to the mobile terminal for video telephony.

The processing buffer of the data link layer analyzes the state of traffic to determine whether the traffic state is not less than the pre-set threshold value. If the state of traffic is not greater than the threshold value, an image input through the camera of the mobile terminal is read as is from a lower layer and then transmitted.

However, if the state of traffic analyzed in the processing buffer is not less than the threshold value, the data link layer transmits a request signal for controlling the image processing level to the upper layer.

Upon receiving the request signal, the upper layer transmits the image processing level control command to the lower layer of the data link layer. Then, the lower layer reduces resolution of the image input through the camera of the mobile terminal and transmits resolution-reduced image to the processing buffer of the data link layer. The resolution reduction is performed, for example, by applying a window having a certain size to the image input through the camera. In performing this reduction, nxn pixels constituting each image may be expressed as a single pixel.

Figure 3A:
FIG. 3A shows an image obtained by a camera of a mobile communication terminal.
Figure 3B:
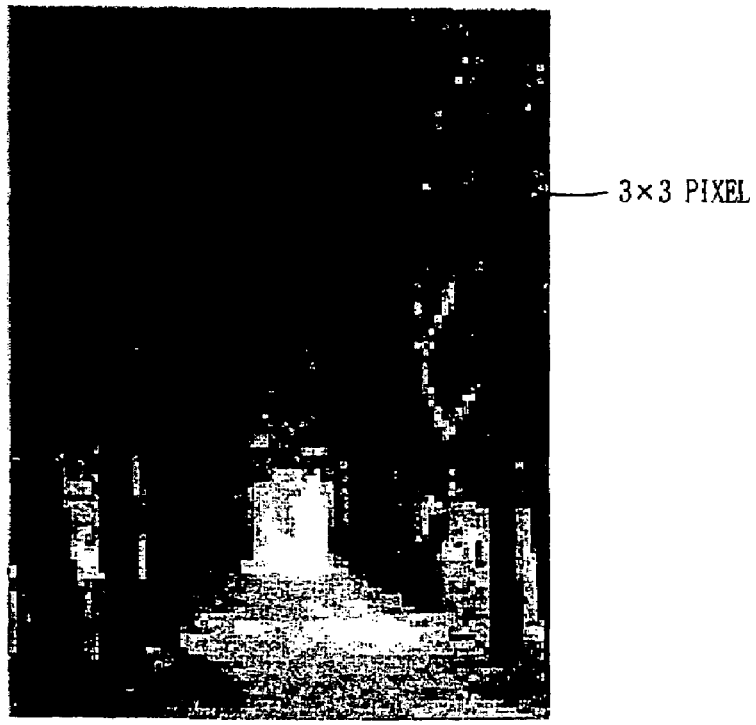
FIG. 3B shows an image obtained by applying a 3×3 pixel of window to FIG. 3A.
Figure 3C:
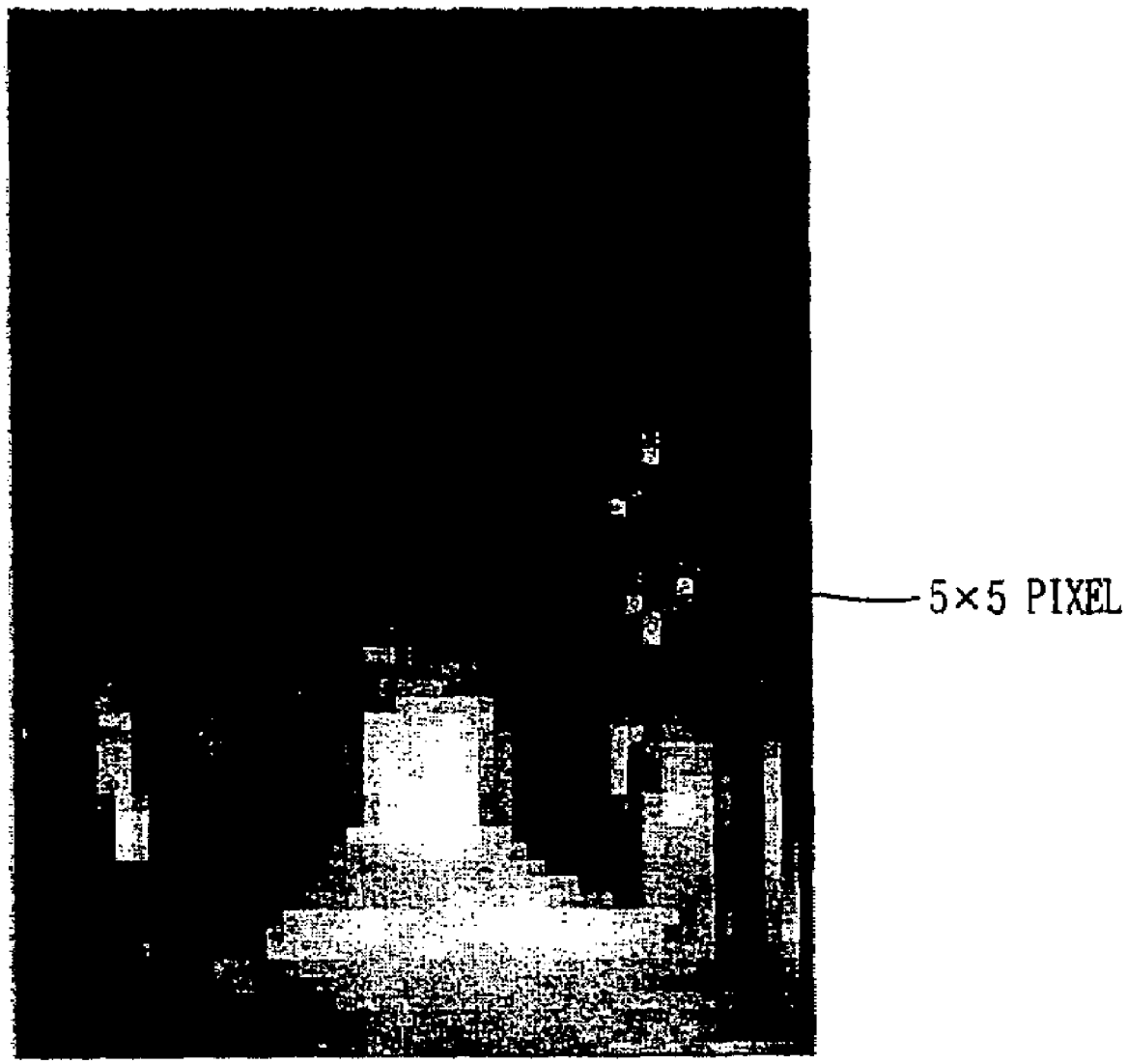
FIG. 3C shows an image obtained by applying a 5×5 pixel of window to FIG. 3A.

FIG. 3A shows an image obtained by a camera of a mobile communication terminal, FIG. 3B shows an image obtained by applying a 3×3 pixel window to FIG. 3A, and FIG. 3C shows an image obtained by applying a 5×5 pixel window to FIG. 3A.

The image shown in FIG. 3A has a distinct picture quality and high resolution. When the resolution of the original image is reduced by applying the 3×3 pixel of window, lines and sides of the image are simplified which results in degraded quality but forms are still recognizable as shown in FIG. 3B.

When the 3×3 pixel of window is applied to an original image with resolution of 120×160, the image can be reduced to have resolution of 40×54, so the data quantity can be reduced to 1/9 of the data quantity of the original image. That is, as many as nine times frames can be transmitted compared to the case of transmitting the original image.

If resolution of the original image is reduced by applying 5×5 pixel window as shown in FIG. 3C, image quality becomes worse than the image of FIG. 3B, but forms are still recognizable. Application of the 5×5 pixel of window can reduce a 120×160 resolution original image to a 24×32 resolution image. As a result, data quantity can be reduced to 1/25 of the data quantity of the original image. Thus, as many as 25 times the number of frames can be transmitted in the same time period required to transmit the original image.

In general, if video has about 15 fps quality, the user can recognize it as a real time video. In most cases, however, 15 fps quality can be hardly obtained in an actual video telephony. Thus, in the image data processing method performed in a mobile communication terminal in accordance with the present invention, since many more frames can be transmitted with the small data quantity, even if traffic is congested, less broken video can be provided compared to the related art.

As so far described, the image data processing method of a mobile communication terminal in accordance with the present invention has at least the following advantages. When traffic of a data link layer exceeds a pre-set threshold value during video telephony, resolution of an image to be transmitted is reduced to thereby reduce data transmission quantity. As a result, natural looking video without a break can be provided.

In addition, video is provided by controlling resolution of a transmission image according to a traffic state of a communication network. This enhances a reliability of a corresponding service quality during video telephony.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. An image processing method for a mobile terminal, comprising:
   pre-setting threshold resolution values for different traffic states;
   pre-setting window sizes for the pre-set threshold resolution values respectively;
   measuring traffic in a channel between the terminal and a network;
   comparing the measured traffic to the different traffic states;
   converting resolution of a terminal image based on one of the pre-set threshold resolution values pre-set for the traffic state nearest the measured traffic; and
   conforming the converted resolution image to one of the pre-set window sizes pre-set for the threshold resolution value that corresponds to the traffic state nearest the measured traffic.

2. The method of claim 1, further comprising:
   transmitting the converted image through said channel.

3. The method of claim 1, wherein each of the pre-set threshold resolution values is set to a prescribed data transmission quantity for a corresponding one of the different traffic states.

4. The method of claim 3, wherein the prescribed quantity is a maximum data transmission quantity.

5. The method of claim 1, wherein the converted image is transmitted from a processing buffer of the terminal.

6. The method of claim 1, wherein the converting step includes:
   converting resolution of the image by a predetermined ratio based on the measured traffic.

7. The method of claim 1, wherein said converting includes converting resolution of the image based on a conversion ratio associated with the closest threshold value.

8. The method of claim 1, wherein the converting step includes:
   reducing resolution of the terminal image based on the measured traffic.

9. The method of claim 1, wherein the image is derived from a camera of the terminal.

10. The method of claim 9, wherein the camera is included in the terminal.

11. The method of claim 1, wherein the measuring step includes:
    determining an amount of traffic in a data link layer associated with the channel between the terminal and network.

12. An image processing method for a mobile terminal, comprising:
    pre-setting threshold values of different traffic states;
    analyzing a current state of traffic when video telephony is started;
    comparing the current traffic state to the pre-set threshold values;
    converting resolution of a terminal image based on a result of the comparison; and
    conforming the converted resolution image to one of a plurality of window sizes pre-set for the threshold resolution value that corresponds to the traffic state nearest the measured traffic.

13. The method of claim 12, wherein the analyzing step includes:
    analyzing a second communications layer using a processing buffer in the terminal.

14. The method of claim 12, wherein the threshold value is a maximum data transmission quantity for corresponding one of the different traffic states.

15. The method of claim 12, wherein the converting step includes:
    transmitting a signal requesting control of an image processing level from a second communication layer to a third communication layer when the current traffic state exceeds one of the pre-set threshold values;
    transmitting an image processing level control command from the third layer to a first communication layer in response to said request signal; and
    converting resolution of the terminal image based on the control command.

16. The method of claim 12, wherein the converting step includes reducing resolution of the image.

17. The method of claim 12, further comprising:
    transmitting the reduced-resolution image through a network.

18. The method of claim 12, wherein the image is derived from a camera of the terminal.

19. The method of claim 18, wherein the camera is included in the terminal.

20. An image processing method for a mobile terminal, comprising:
    setting one or more threshold values for different traffic states:
    analyzing a current traffic state along a channel between the terminal and a network;
    comparing the current traffic state to the one or more threshold values;
    converting a resolution of the terminal image based on a result of the comparison; and
    conforming the converted resolution image to one of a plurality of window sizes pre-set for the threshold resolution value that corresponds to the traffic state nearest the measured traffic, wherein said analyzing is performed by a processing buffer of a second communication layer of the terminal.

21. The method of claim 20, transmitting the reduced-resolution image over the channel.

22. The method of claim 20, wherein the comparing step includes:
- if traffic exceeds one of the threshold values, transmitting a signal requesting control of an image processing level from the second layer to a third layer; and
- transmitting an image processing level control command from the third layer to a first layer in response to the request signal, said control command defining an image resolution ratio.

23. The method of claim 20, wherein the image is derived from a terminal camera.

24. The method of claim 23, wherein the camera is included in the terminal.

25. An image processing system, comprising:
- a memory for storing one or more resolution ratios for a corresponding number of traffic states, and for storing a plurality of window sizes each corresponding to a respective one of the resolution ratios; and
- a processor which compares a current traffic state on a channel to the traffic states in said memory, and converts resolution of a mobile terminal image based on a result of the comparison, said processor further conforming the converted resolution image to the window size pre-set for a nearest one of the resolution ratios that corresponds to the current traffic state.

26. The system of claim 25, wherein said memory stores a plurality of resolution ratios for a corresponding number of traffic states.

27. The system of claim 25, wherein the current traffic state and the traffic states stored in said memory are data transmission rates.

28. The system of claim 25, wherein the processor reduces resolution of the mobile terminal image based on a result of the comparison.

29. A mobile terminal, comprising:
- a camera; and
- an image processing system as recited in claim 25 for converting resolution of an image obtained by the camera.

* * * * *